United States Patent Office 3,454,544
Patented July 8, 1969

3,454,544
PROCESS FOR THE CHLORINATION
OF POLYOLEFINS
Warren L. Young, Baton Rouge, and Bob Posey, Jr., Plaquemine, La., assignors to The Dow Chemical Company, Midland, Mich., a corporation of Delaware
No Drawing. Continuation-in-part of application Ser. No. 360,486, Apr. 17, 1964, which is a continuation-in-part of application Ser. No. 279,035, May 6, 1963. This application Nov. 29, 1966, Ser. No. 597,513
Int. Cl. C08f 27/03, 45/04
U.S. Cl. 260—88.2    4 Claims This application is a continuation-in-part of copending application Ser. No. 360,486, filed Apr. 17, 1964, now abandoned which is in turn a continuation-in-part of application Ser. No. 279,035, filed May 6, 1963 (now abandoned).

The present invention relates to improved chlorinated polyolefins and to methods for their preparation. It bears special reference to a novel procedure for preparing improved chlorinated polymers and interpolymers of ethylene, propylene, butylene and the like in suspension in an inert diluent.

Various methods are known for chlorinating polyethylene and other polyolefins which have been conventionally prepared, for example, by polymerizing the monomeric olefin in the presence of polymerization-favoring quantities of oxygen and water having a pH greater than 7 under a pressure of at least 500 and, advantageously, 3000 atmospheres and at temperatures of from 150 to 275° C. The known methods for chlorinating polyethylene and other polyolefins prepared in this or an equivalent manner (which generally have extensively branched or side-chain network-containing molecular structures and seldom attain molecular weights in excess of about 40,000) usually involve the practice of catalyzing the reaction by illumination or chemical agents, such as azo-type catalysts, while the polymer being chlorinated is maintained in an inert solvent or suspending medium. Frequently, such chlorinations are conducted under super-atmospheric pressures.

Distinct species and varieties of polyethylene, polypropylene, polybutylene and their copolymers are also available which have essentially linear and unbranched molecular structures that are relatively free from extensive side-chain networks and which have apparent molecular weights (as would be indicated from observation of such of their intrinsic properties as melt viscosity and the like) in excess of 5,000 and, more advantageously, from at least 20,000 to as much as 5,000,000 and greater.

It is known that polyolefins, and particularly essentially linear and unbranched polyolefins, may be chlorinated by subjecting them to the action of a chlorinating agent in the presence of a free radical catalyst while the polymer being chlorinated is dissolved in a solvent liquid which is substantially inert to the chlorinating agent and while the chlorination is being conducted at a temperature which is at least about that required for the solvent liquid to dissolve about 1 percent by weight of the polymer and not in excess of a temperature that might induce substantial deleterious dehydrochlorination of the chlorinated polymer to occur. The chlorinated polyolefins prepared in accordance with such solution chlorinating techniques, particularly chlorinated polyethylenes, usually have a more uniform or random distribution of the substituent chlorine atoms along the polymer molecule than may otherwise be readily obtained.

Generally, products prepared in accordance with solution chlorinating processes, such as described in U.S. Patent No. 3,110,709, are characterized by enhanced elongations and elasticities. Further, it is known that these materials tend to become essentially non-crystalline when chlorinated to an extent of from 25 to 29 percent, and, when chlorinated to an extent of between about 35 and 45 percent chlorine, often become tacky or gummy and suffer from a significant loss of dimensional stability and physical strength properties including low zero strength temperatures.

It is also pointed out that large amounts of organic solvents are required for the hereinbefore described solution chlorination procedures with the resulting economically undesirable necessity for recovering the same following completion of the chlorination reaction.

Alternatively, it is known that linear and unbranched polyolefins may be chlorinated by suspending them as a finely divided mass in an inert liquid to form a slurry and maintaining the slurry in an agitated condition while subjecting the polyolefin in the slurry to the action of chlorine at a temperature between room temperature and about five centigrade degrees below the sintering temperature of the polymer in liquid suspension, until the desired chlorine content is obtained.

The chlorinated polyolefins prepared in accordance with such prior known suspension chlorinating techniques, especially linear, macromolecular polyolefins and particularly essentially linear and unbranched polyethylene usually have a more intermittent, non-statistical distribution of the type wherein the substituent chlorine atoms are attached in block-like concentrations or groupings along the polymer molecule, which groupings are separated by substantially unsubstituted groupings of adjacent basic units, such as methylene, in the polymer chain. The block-like substituent chlorine groupings occur at greater intervals than might be predictable merely by the laws of chance. Such chlorine distribution in an essentially linear and unbranched polyethylene, for example, may be such that relatively long chains of unchlorinated adjacent methylene groups may be found at random points in the polymer molecule.

Products prepared in accordance with such prior known suspension chlorinating methods, having the intermittent, non-statistical, block-like distribution of combined chlorine, are generally characterized by higher tensile strengths than may be obtained by other known methods, but suffer from reduced elasticity (high modulus) and reduced heat stability. Such materials are also known to retain significant relative crystallinity (as determined by conventional X-ray diffraction techniques) even when containing from about 40 to 45 percent, or more, of chemically combined chlorine.

It is also known that the crystallite structures characteristic of chlorinated polyethylenes prepared in aqueous suspension at temperatures between about room temperature and their sintering temperature, may be significantly altered by chlorinating such materials in aqueous suspension at temperatures above their sintering points, up to about 150° C. Such materials tend to become less crystalline and more elastic in nature, however, such technique, when using polymers having a molecular weight of less than about 1,000,000, may result in significant agglomeration of the polymer particles with resulting loss in homogeneity of the chlorinated product. U.S. Patent No. 3,227,781 describes a suspension chlorination process carried out in stages, wherein polyethylene is first chlorinated at a temperature between 50 and 110° C. up to a chlorine content of at least 10 percent by weight of the polyethylene and preferably wherein from 25 to 65 percent by weight of chlorine is introduced in the first stage, and then at a temperature above 100–110° C. until the desired chlorine content is reached, thereby forming flocculent substances which are of rubber-like or hard nature, depending on their chlorine content. Materials prepared by the preferred embodiments of the process of U.S. 3,227,781 are characterized by enhanced flexibility but generally have little elastic recovery when elongated as little as about 100 percent.

It is an object of this invention to provide solid, easily processable chlorinated polyolefins having significantly enhanced elastomeric, elongatible and heat-resistant properties while retaining much of the beneficial tensile strength characteristics of the prior known suspension chlorinated polyolefins having intermittent, non-statistical block-like distribution of combined chlorine.

It is a further object to provide an improved procedure for preparing such products by suspension chlorination utilizing highly critical conditions of temperature and chlorine addition.

Other and related objects and advantages will become evident from the following specification and claims.

The foregoing and related objects are obtained by practice of a chlorination procedure which comprehends the suspension chlorination in an inert medium of finely divided essentially linear polyethylene and interpolymers contaning at least about 90 mole percent ethylene with the remainder being one or more ethylenically unsaturated comonomers, to a desired total of combined chlorine content, wherein such polymer is first chlorinated at a temperature above its agglomeration temperature for a period sufficient to provide a chlorine content of from about 2 to 23 percent chlorine, based on the total weight of the polymer; followed by the sequential suspension chlorination of such polymer, in a particulate form, at a temperature above its agglomeration temperature but at least about 2° C. below its crystalline melting point for a period sufficient to provide a combined chlorine content of up to about 75 weight percent, based on the total weight of the polymer.

It has surprisingly been found that clorination in the first stage to as little as about 2 percent by weight of chlorine advantageously causes the polyolefinic material being chlorinated to lose its crystallinity at a faster rate as the chlorination temperature is increased. A possible explanation for this result is that strain is induced into the polyolefin crystallites by chlorination of the exposed crystallite surfaces at low temperatures, and that the crystallites so chlorinated tend to melt at lower temperatures than non-chlorinated crystallites.

In this regard, it has also been discovered, which discovery forms a particularly preferred embodiment of the present invention, that introduction of from 2 to less than 10 percent by weight of chlorine during the first stage chlorination is desirable as it allows the formation of chlorinated products having an unexpectedly high degree of flexibility, especially at total chlorine contents below about 35 percent by weight.

The temperature at which the chlorination normally leads to an agglomeration of the polymer depends to a large extent on the nature and the molecular weight of the polyolefin to be chlorinated. In the case of crystalline and predominantly straight chain polyethylenes having a branching of the chains of less than 1 methyl group per 100 carbon atoms and a density of at least 0.94, i.e. polyethylenes which are predominantly obtained by the low pressure synthesis, the aforesaid temperature is above 95° C., in particular above 100° C. or even above 110° C. In the case of polyethylenes having a relatively marked branching of the chains and a lower density and which are normally prepared by polymerizing ethylene under a high pressure, the said temperature limit is lower, namely, at about 65° C.

Further, it has been found that if the first stage chlorination is carried out to an amount exceeding about 23 weight percent chlorine, based on the total weight of the polymer, excessive amounts of polymeric materials having the chlorine substituents present in considerable block-like concentration or grouping along the polymer molecules are produced with resultant losses in elasticity and resistance to the deleterious effects of heat.

Additionally, it has been found that the sequential chlorination must be conducted at a temperature above that temperature employed for the first chlorination, but below the crystalline melting point of the polyolefin starting material, to provide materials having the combination of desirable properties described herein. In this regard, it has been found that the temperature employed in such sequential chlorination must necessarily be greater than that employed in the initial chlorination to prevent the retention of excessive undesirable crystallinity with resultant formation of non-uniformly chlorinated polymer; furthermore, if such temperature is above the crystalline melting point of the polymer being chlorinated, particularly when using polymer having a molecular weight of between about 20,000 and 300,000, it has been found that particle size growth is greatly accelerated with resultant development of undesirable agglomeration of the polymer material.

Thus, the temperature employed in the herein described sequential suspension chlorination is that temperature at which a desirable balance between particle growth and destruction of crystallinity is obtained. Such temperature is, therefore, highly critical and is advantageously individually determined with respect to the polyolefin used, the desired chlorine content, and the desired physical properties of the so-formed chlorinated polymeric material. By way of further explanation, the second-stage temperature falls within a narrow range which is characteristic of the polymer being chlorinated and must be individually determined. It has been found, for example, that this critical range of second-stage temperatures, for ethylene polymers having a density of at least 0.960 and a specific surface area of less than about 2 m.$^2$/g., will fall between 2° and 11° C. below the crystalline melting point for polymers having molecular weights of about 150,000 to about 300,000, and between about 3° and 13° below the crystalline melting point for polymers having molecular weights of between about 20,000 to about 150,000. In addition, if the aforementioned polymers have specific surface areas of greater than about 2 m.$^2$/g., then these critical temperatures may fall as much as 3° C. below the ranges indicated. A density of less than about 0.960 may also cause the critical temperature range to be as much as 3° C. lower than previously indicated. By way of specific example, a linear polyethylene having a molecular weight of about 65,000, a density of at least 0.960, a specific surface area of about 1 m.$^2$/g., and a crystalline melting point of 133° C. has a critical range of 121°–129° C. Above that temperature, the particles sintered and agglomerated badly so that excessive polyethylene type crystallinity was retained, and below the range it was not possible to destroy the polyethylene type crystallinity effectively. This critical temperature range is that in which it becomes possible to prepare chlorinated polyethylenes of very high flexibility (100 percent modulus less than 300 p.s.i.) while maintaining good tensile strength and other desirable characteristics such as a small particle size, and is generally that temperature above the agglomeration temperature of the polymer being chlorinated which is between about 2 and 19° C. below the crystalline melting point of such polymer.

Still further, it has been found that in this critical temperature range, particularly in the upper portions of it, control of particle size is very essential to the process. Unless particle growth is controlled by some means, agglomeration of the particles may proceed to the point where lumps of several inches or more in diameter are formed. These large lumps make it practically impossible to wash out entrained acid and the heat resistance of the product is lessened. The very low surface area of these lumps also makes it impossible to obtain good distribution of the chlorine atoms in the polymer.

The process of U.S. Patent 3,227,781 eliminates the problem of particle growth by accomplishing the preponderance of the chlorination in the first or low temperature stage, and then concluding by the addition of a small amount of chlorine at some temperature which appears to be below what we are defining as a critical temperature range. Thus, for a chlorine content of 50 percent by weight, the process of this patent would call for adding 35–40 percent chlorine, or more, in the first stage or low temperature chlorination. Or as an alternate step, they perform the entire chlorination at some temperature below the critical range.

It has been found, however, that such procedures do not provide for the highly flexible products of the present invention.

It has, however, been found to be of special advantage to carry out the chlorination in the presence of inert substances of inorganic or organic chemical nature which are such that they have an affinity for adsorption onto the surfaces of the polyolefin during chlorination so that they may function as barriers to inhibit particle agglomeration. In this regard, it has been found that magnesium silicate, while generally showing some tendency toward particle growth inhibition in most of its forms, is suprisingly and unexpectedly effective when used in the form of a platy talc. Finely divided silica, on the other hand, is so inert to the polymer that it is virtually not adsorbed at all and is, for all practical purposes, completely ineffective. Exemplary of other useful inert materials are: carbon black and titanium dioxide and the like. Such materials may be employed for the desired purpose without significantly detracting from the highly desirable elastomeric properties of the polymer. As previously indicated, the addition of such fillers serves to inhibit particle growth during chlorination and thus advantageously serves to effectively inhibit the development of undesirable polymeric agglomerates. By way of comparison, fillers such as silica, barium sulfate, and other materials which have little if any affinity for adsorption onto the polymer being chlorinated are ineffective at reasonable concentrations as particle growth inhibitors in this process. Further, the use of polyvinyl chloride to inhibit agglomeration is also not practical because, if it is used in a concentration high enough to effectively inhibit the particle growth, it will cause stiffening of the flexible materials resulting from this process and loss of resistance to the deleterious effects of heat.

Preferably, the polyolefinic materials to be chlorinated are those distinct species and varieties of essentially linear and unbranched highly porous polymers containing at least about 90 mole percent ethylene in the polymer molecule with a remainder being one or more ethylenically unsaturated comonomers, such polymers being prepared under the influence of catalyst systems comprising admixtures of strong reducing agents such as triethyl aluminum and compounds of Groups IV–B, V–B and VI–B metals of the Periodic System, such as titanium tetrachloride, and the like, and having a molecular weight less than about 1,000,000 and preferably between about 20,000 and 300,000, to provide for optimum flexibility, i.e. a 100 percent modulus of less than about 300 p.s.i.

Exemplary of useful ethylenically unsaturated comonomers are the non-aromatic hydrocarbon olefins having 3 or more carbon atoms such as propylene, butene-1 and 1,7-octadiene and the like; cycloaliphatic olefins such as cyclopentene and 1,5-cyclooctadiene and the like; substituted olefins such as acrylic acid and its esters; conjugated diolefins such as butadiene and the like; and the alkenyl aromatic compounds such as styrene and its derivatives, among many other polymerizable materials known to the art.

It is to be pointed out, however, that conventionally prepared low density, branched polyolefins may often be advantageously chlorinated by the process of the present invention, providing such materials are available in finely comminuted form.

The inert liquid which is employed to suspend the finely divided polymer in the suspension chlorinating procedure of the present invention may be any liquid which is inert to the polymer and is not affected to an appreciable extent by chlorine, or which, while wetting the polymer will not have an appreciable solvent effect on it. While water may be employed with especial advantage as an inert suspending liquid for polyolefins to be chlorinated, the polymer may also be suspended in other inert liquids.

A variety of wetting agents, including sulfonates, sulfates, polyphosphates and other types of ionic and nonionic surfactant materials may be suitably employed, if desired, to assist the inert suspending liquid, particularly when it is water, to wet the polymer. Such materials as sodium lauryl sulfate and alkyl aryl polyether alcohols are illustrative of specific wetting agents that may be utilized. The employment of a wetting agent facilitates the suspension and uniform distribution of the polymer during the chlorination. In some cases, however, it may not be necessary to employ wetting agents, especially when a freshly prepared polymer is employed that is undried after its preparation or when efficient agitation is available for producing and maintaining the polymer slurry.

If it is desired to accelerate the chlorination rate, the reaction may be assisted by the employment of small quantities of catalysts, such as the free-radical types and/or ultra-violet light. When a free-radical catalyst is employed, the rate of reaction which is accomplished through the assistance of the catalyst will depend on such factors as the catalyst concentration, the temperature of the suspending medium in which the catalyst is dissolved, the pH of the solution and the chlorine pressure. Various azotype compounds and peroxides selected from the group of free-radical catalysts consisting of tertiary butyl peroxide; tertiary butyl hydroperoxide; and the like may advantageously be employed. Preferably, when catalysts are employed, such catalyst should be one which has an efficient rate of decomposition in the suspending medium in which it is dissolved in the required temperature range. In this regard, it may be advantageous to employ a mixture of such catalysts, one of which has a temperature of efficient decomposition at or near the optimum initial chlorination temperature, and the other having an efficient decomposition at or near the optimum sequential chlorination temperature. Such catalysts may be added in a single step or continuously depending upon the reaction conditions and catalyst used.

Part of the suspension chlorination procedure of the present invention may be carried out at atmospheric pressure; however, best results are generally obtained wherein super-atmospheric pressures are employed. Such chlorination pressure is not critical except as necessary to obtain an efficient rate of reaction. In this regard, it is pointed out that for a given catalyst or admixture thereof, at a given concentration in the suspending medium, the reaction rate is conveniently controlled by the rate of feed of chlorine and/or its partial pressure in the reaction vessel.

After a polyolefinic material has been suspension chlorinated to a desired degree, it may easily be filtered from suspension in the inert suspending liquid and washed and dried to prepare it for subsequent use.

The entire chlorination procedure or any desired part of it may be carried out batchwise or by continuous processing arrangements. For batch operations, it is ordinarily suitable to employ conventional autoclaves and kettles or the like for conducting the reaction. However, it may also be conveniently conducted in a continuous process by one of several suitable techniques. For example, it may be conducted by countercurrent movement of the reactants through either horizontally or vertically disposed reactors which may be in the form of tubes and towers, or by using a cascading principle with a series of interconnected reaction chambers.

Substantially quantitative yields, based on the weight of the polymer to be chlorinated, may be frequently obtained by the chlorinating technique of the present invention. The attainment of such yields, as has been indicated, may often be facilitated by the practice of recycling techniques for unreacted portions of the chlorine and by conducting the involved reactions at more moderate rates.

Stabilizers may also be included in the compositions to protect the chlorinated olefin polymer against possible decomposition by the heat of processing or by subsequent exposure of fabricated sheet material to climatic and environmental conditions of use. Suitable stabilizers include those materials conventionally employed in the preparation of vinyl polymer and copolymer sheet compositions, e.g., organic complexes and/or salts of lead, tin, barium, cadmium, zinc, sodium, etc., and particularly the sulfur containing organo tin compounds including the alkyl tin mercaptides as well as dibutyl tin laurate and dibutyl tin maleate and various epoxide compounds such as the epoxidized fatty acids and oils, among others. Stabilizers are preferably used in amounts sufficient to provide between about 1 and 10 parts by weight per 100 parts of the chlorinated olefin polymer constituent. Other conventional additives, such as non-epoxidized fatty acids and oils, and low molecular weight polymers and waxes may also be employed, if desired.

Although the chlorinated olefin polymers employed for the purposes of the present invention are inherently resistant to burning, it may in some instances be advantageous to incorporate minor amounts, i.e., from between about 1 and 10 parts per 100 parts of chlorinated olefin polymer, of one or more flame-retarding agents, e.g., oxides of antimony and/or various halogenated materials such as tetrabromophthalic anhydride, perchloropentacyclodecane, tris (2,3-dibromopropyl)phosphate, tetrabromo bisphenol-A, among many others.

The following examples, wherein all parts and percentages are to be taken by weight, illustrate the present invention but are not to be construed as limiting its scope.

Example 1

In each of a series of experiments, an aqueous slurry comprising from about 3200 to 3600 grams of water and 160 to 180 grams of a polyethylene having an essentially linear and unbranched molecular structure containing less than about 1 methyl group per 100 methylene units in its molecule; a density of about 0.96; an average molecular weight of about 67,000 and which had been prepared by the previously referred to Ziegler catalyst process using a catalyst composed of triisobutyl aluminum and titanium tetrachloride; was charged to a 1½ gallon autoclave with from 6.4 to 7.2 grams of calcium chloride; from 3.2 to 3.6 g. of a platy magnesium silicate; about 0.5 cc. of ditertiary butyl peroxide; and from about 24 to 27 drops of a commercially available wetting agent. Each charge was then separately chlorinated, as a first suspension chlorination step, under about 13 to 47 p.s.i. (gauge) of chlorine pressure at a temperature of between about 82 and 115° C. until a chlorine content of between about 5 and 23 percent was obtained.

Following completion of such first chlorination step, each charge was further individually chlorinated in a second suspension chlorination step, under a gauge pressure of 17–35 p.s.i. (as was considered necessary to obtain an efficient rate of chlorination), at a temperature of 126° C. until a total chlorine content of between 35 and 45 percent was obtained.

For comparative purposes, samples of the non-chlorinated polyethylene were individually placed in aqueous suspension essentially as described herein, and subsequently chlorinated in a single step to a total chlorination content of about 34 percent, utilizing a temperature of from about 115 to 120° C. These samples are hereinafter identified as comparison A.

In yet another series of comparisons, individual samples of the same non-chlorinated polyethylene were separately suspension chlorinated in two steps essentially as described herein, but wherein an excess of chlorine was introduced during the first chlorination step. These samples are hereinafter identified as comparison B.

In still another series of comparative experiments samples of the non-chlorinated polyethylene polymer were individually placed in a reactor and separately dissolved in symmetrical 1,1,2,2-tetrachloroethane at 115 to 120° C. The reactor was flushed with nitrogen and chlorine gas passed therein. In each instance, the temperature was maintained at from 115 to 120° C. during the chlorination, and the reaction mixture agitated. At the end of the reaction period, the reaction mixture was poured into from 5 to 7 times its volume of methanol, which acted as an antisolvent to precipitate the polymer. The solvent was then removed and the residue dried. These samples are hereinafter identified as comparison C.

The following Table I summarizes the physical properties of the above-described chlorinated polymers.

The column headings of the following Tables I, II, and III have the following meanings:

| | |
|---|---|
| Percent chlorine for suspension chlorinated materials. | Determined by titration of HCl in aqueous slurry. |
| Percent chlorine for solution chlorinated materials. | Determined by titration of chloride ions using $AgNO_3$. |
| Percent relative crystallinity | Ratio of crystalline peak areas to the sum of the amorphous plus crystalline peak area as determined by conventional X-ray diffraction techniques. |
| Percent elongation | As per ASTM Test No. D-142-61T. |
| Tensile strength, p.s.i. | Do. |
| Heat stability | Time in minutes for a stabilized polymer* to become dark red in color while being milled on a two roll compounding mill operating at 370° F. |
| 100% modulus | As per ASTM Test No. D-412-62T. |

*Materials containing conventional amounts and types of vinyl resin stabilizers such as metallic mercaptides, epoxide containing compounds and/or metallic soaps and the like.

TABLE I

| | Chlorination procedure | | | | Percent relative crystal- linity | Elongation, percent | Tensile strength, p.s.i. | 100% modulus, p.s.i. |
|---|---|---|---|---|---|---|---|---|
| | Step 1 | | Step 2 | | | | | |
| Run No. | Temp., ° C. | Percent chlorine | Temp., ° C. | Final percent chlorine | | | | |
| Comparison A (Suspension): | | | | | | | | |
| 1 | 115 | 34 | | 34 | 26.5 | 230 | 2,170 | 2,170 |
| 2 | 120 | 34 | | 34 | 28.6 | 350 | 1,830 | 1,840 |
| Comparison B (Suspension): | | | | | | | | |
| 3 | 82–86 | 30.6 | 120 | 43.2 | 10.8 | 375 | 3,000 | 1,225 |
| 4 | 82–89 | 30 | 126 | 45 | 0 | 370 | 2,025 | 810 |
| 5 | 101–108 | 30 | 126 | 35 | 9.2 | 500 | 2,025 | 725 |
| 6 | 90 | 26.3 | 126 | 34 | 12 | 573 | 1,710 | 575 |
| Comparison C (Solution): | | | | | | | | |
| 7 | 115–120 | 20.8 | | 20.8 | 19.2 | 780 | 1,710 | 700 |
| 8 | 115–120 | 24.5 | | 24.5 | 14.5 | 800 | 2,200 | 570 |
| 9 | 115–120 | 28.4 | | 28.4 | 7.4 | 850 | 3,150 | 470 |
| 10 | 115–120 | 32.2 | | 32.2 | 0 | 800 | 2,550 | 280 |
| 11 | 115–120 | 37.0 | | 37.0 | 0 | 800 | 1,220 | 170 |
| 12 | 115–120 | 45.5 | | 45.5 | 0 | 430 | 1,470 | 260 |
| This invention: | | | | | | | | |
| 13 | 94–97 | 18 | 126 | 43.2 | 0 | 500 | 1,775 | 220 |
| 14 | 89.5–95 | 23 | 126 | 45 | 0 | 500 | 1,900 | 270 |
| 15 | 101–114.5 | 22 | 126 | 35 | | 600 | 1,750 | 265 |
| 16 | 101–102 | 5 | 126 | 45 | 0 | 400 | 1,525 | 190 |
| 17 | 101–102 | 5 | 126 | 35 | 4.1 | 825 | 1,325 | 145 |

The data of Table I clearly illustrates that the products prepared by the process of the present invention are characterized by having unexpectedly enhanced flexibility (reduced 100 percent modulus), as compared to the prior known suspension chlorinated materials designated as Comparisons A and B. Further, it is apparent that the products of this invention have greater elongation at a given chlorine content than such prior known suspension chlorinated materials. It is also apparent that the products of this invention have an inherent flexibility and elongation characteristic of prior known solution chlorinated materials.

Example 2

A 5 percent aqueous slurry of a copolymer composed of (1) about 99.3 weight percent ethylene and (2) about 0.7 weight percent butene having an essentially linear and unbranched molecular structure, except for such butene branches; a density of greater than about 0.94; a melt index of about 0.34; a relative crystallinity of about 48.1 percent; and which has been prepared by the previously referred-to Ziegler process using triethyl aluminum and titanium tetrachloride; was chlorinated essentially as described in Example 1, and the chlorinated product recovered and tested as described therein.

The following Table II summarizes the physical properties of the above-described chlorinated copolymer as well as those properties of the same ethylene/butene copolymer which was chlorinated in a single step for purposes of comparison.

The chlorinated products that are available by practice of the procedures of the present invention have a wide variety of uses and applications. Optimum utility, of course, may depend upon the nature of the polymer employed and the halogen content of the final product. For example, they may be made into films and other extruded forms and shapes for employment in packaging and other protective and decorative applications. Advantage may be taken of their flame resisting or fire retarding characteristics. They may also be employed in coatings or cast and molded into a variety of useful shapes having desirable properties and characteristics. Or they may be prepared into expanded foam structures by the incorporation and release of suitable blowing agents and propellants in a known manner. In addition, they may be advantageously blended with other types of polymeric materials such as polymers of vinyl chloride and polyethylene and the like to obtain improved and more desirable products for any of these uses. Additionally, the non-chlorinated polyolefins as described herein, may in some instances be advantageously blended with other types of materials, such as vinyl polymers including the homopolymers and interpolymers of vinyl chloride, and subsequently chlorinated utilizing the process of the present invention. It has further been found that many of the chlorinated products, as described herein, may advantageously be solvent welded (particularly where they have a relative crystallinity of less than about 5 percent) and are capable of adhering extremely well to oil base paints and the like. Still further, such products are not

TABLE II.—CHLORINATED LINEAR ETHYLENE/BUTEN COPOLYMER

| | Chlorination procedure | | | | | | | | |
|---|---|---|---|---|---|---|---|---|---|
| | Step 1 | | Step 2 | | Percent relative crystallinity | Heat stability, minutes | Elongation, percent | Tensile strength, p.s.i. | 100% modulus, p.s.i. |
| Run No. | Temp., °C. | Percent chlorine | Temp., °C. | Final percent chlorine | | | | | |
| For comparison: | | | | | | | | | |
| 18 | 86 | 32.6 | | 32.6 | 25 | 20 | 100 | 1,850 | 1,850 |
| This invention: | | | | | | | | | |
| 19 | 87 | 18.2 | 118 | 34 | 1 | 32 | 800 | 1,300 | 200 |
| 20* | 86.5 | 17.7 | 118.5 | 34.5 | 1 | | 800 | 1,500 | 200 |

*40 grams of TiO$_2$ added to reaction vessel prior to chlorination.

Example 3

In each of a series of experiments, 3200 grams of water, 160 grams of linear polyethylene having a molecular weight of about 65,000, 6.4 grams of calcium chloride, 24 drops of a commercially available wetting agent and 3.2 grams of magnesium silicate, in the form of a platy talc, were charged into a 5-liter autoclave. Each charge was then separately chlorinated as a first suspension chlorination step at a temperature of between about 90 to 95° C. until a chlorine content of between 0 and 18 percent was obtained. Following completion of such first chlorination step, the temperature was then raised to 126° C. and sufficient additional chlorine introduced to bring the total chlorine content of each sample to 28 percent by weight. The physical properties of these chlorinated polymers are given in the following Table III. These results illustrate the unexpected flexibility obtained in materials wherein less than 10 percent of chlorine is introduced during the first chlorination step.

deleteriously affected by acids and bases such as concentrated HCl or NaOH.

Further, it has been found that chlorinated olefin polymers prepared by the process of this invention can be easily fabricated without the addition of significant amounts of plasticizers or other processing aids. By way of illustration, it has been found that non-plasticized chlorinated polyolefins of the present invention can be extruded through a standard Instron rheometer orifice, using a 190° C. barrel temperature, at a 150 sec.$^{-1}$ shear rate with a resultant shear stress of fom 25–65 p.s.i. or less, whereas, under the same conditions chlorinated polyethylenes having a molecular weight of from 1,000,000 to 5,000,000 are generally characterized by a shear stress of greater than about 85 p.s.i. and often cannot be made to pass through the orifice of the rheometer.

What is claimed is:

1. In the process for the chlorination of an essentially linear polyolefin in suspension in an inert liquid wherein said chlorination takes place at least in part at a tempera-

TABLE III

| | Chlorination procedure | | | | | | |
|---|---|---|---|---|---|---|---|
| | Step 1 | | Step 2 | | | | |
| Run No. | Temp., °C. | Percent chlorine | Temp., °C. | Final percent chlorine | Elongation, percent | Tensile strength p.s.i. | 100% modulus, p.s.i. |
| 21 | 90–95 | 0 | 126 | 28 | 650 | 1,500 | 515 |
| 22 | 90–95 | 5 | 126 | 28 | 1,025 | 1,625 | 245 |
| 23 | 90–95 | 18 | 126 | 28 | 825 | 1,675 | 430 | ture above the agglomeration temperature of said polyolefin, the improvement consisting of: first chlorinating said polyolefin at a temperature below its agglomeration temperature up to a chlorine content of at least about 2 but less than 10 percent based on the weight of said polyolefin, and then chlorinating said polyolefin in a second stage at a temperature above the agglomeration temperature but below the crystalline melting point of said polyolefin.

2. In the process for the chlorination of an essentially linear polyolefin in suspension in an inert liquid wherein said chlorination takes place at least in part at a temperature above the agglomeration temperature of said polyolefin, the improvement consisting of: first chlorinating said polyolefin at a temperature below its agglomeration temperature up to a chlorine content of between about 2 and 23 percent based on the weight of said polyolefin, and then chlorinating said polyolefin in a second stage at a temperature above the agglomeration temperature but below the crystalline melting point of said polyolefin wherein said chlorination is carried out in the presence of an inert filler which has an affinity for adsorption onto the surfaces of the polymer being chlorinated.

3. The process of claim 2 wherein said inert filler is magnesium silicate.

4. The process of claim 3 wherein said magnesium silicate is in the form of a platy talc.

References Cited
FOREIGN PATENTS 828,938 2/1960 England.
882,524 11/1961 England.

JAMES A. SEIDLECK, *Primary Examiner.*

U.S. Cl. X.R.

144—317; 156—350; 260—23, 41, 45.75, 45.95, 45.7, 86.7, 85.3, 88.1, 94.9